UNITED STATES PATENT OFFICE.

CHESTER B. ALLEN, OF MEMPHIS, TENNESSEE.

WATERPROOF CEMENT.

1,231,468.  Specification of Letters Patent.  Patented June 26, 1917.

No Drawing. Application filed February 23, 1916, Serial No. 80,060. Renewed December 18, 1916. Serial No. 137,711.

*To all whom it may concern:*

Be it known that I, CHESTER B. ALLEN, a citizen of the United States, residing at Memphis, in the county of Shelby, State of Tennessee, have invented certain new and useful Improvements in Waterproof Cement, of which the following is a full, clear, and exact specification.

This invention relates to an adhesive composition or cement, and has for its object the production of an inexpensive adhesive substance especially designed for uniting wood veneers or other parts very securely together, said adhesive substance after having been brought into the condition for uniting the parts being itself insoluble in water and impervious to heat.

My composition consists of a mixture of blood, lime, caustic alkali and water, and I prefer to use these ingredients in about the following proportions, viz:

80% by weight of pure warm water,
13⅓% by weight of desiccated blood,
3⅓% by weight of lime,
3⅓% by weight of commercial caustic alkali.

These ingredients are mixed together and heated to a temperature of 200° F., the mixture being stirred continuously. As the temperature of the mixture rises it thickens, and when it reaches 200° F. it is in the form of a thick paste which is allowed to cool before being applied between wood veneers or other parts to be united. During this treatment, the caustic alkali softens the blood and allows it to form a solution with the lime water, making a thick gelatinous mass of which the cement is composed. The lime is added to the mixture to form lime water, which, when the whole mass is heated after being spread upon the wood or parts to be cemented, will act upon the wood rendering it more porous and more easily penetrated by the cement. Furthermore, the lime renders the wood less pervious to water after cemented and decreases the tendency to swell.

While I prefer to use desiccated or dry blood, and the proportions above stated are based on the use of this form of blood, it will be understood that other forms such as liquid blood may be used by slightly varying the proportions to suit. Instead of lime, calcium oxid, calcium carbonate, calcium sulfate, or calcium hydroxid may be used if the proportions stated are varied according to the strength of the substances. The caustic employed may be sodium hydroxid, potassium hydroxid, caustic alkali potash, caustic soda, lye of all grades, or mixtures of any of these substances.

The mixture prepared as above described is applied to the surfaces to be united and the parts are placed between two plates which are heated by steam to a temperature of from 280° to 327° F., and said heated plates are subjected to a pressure varying from 75 to 150 pounds to the square inch. The heat generated by the plates brings about a chemical change in the composition or mixture which then possesses an adhesive quality which strongly unites the parts, and after said parts have been allowed to cool and become thoroughly dry, said adhesive composition or cement is insoluble in water and impervious to heat.

Having thus described my invention, what I claim as new and desire to secure by Letters Patent of the United States is:

A composition for the purpose specified prepared from the following ingredients in substantially the proportions stated, namely, 13⅓% by weight of desiccated blood, 3⅓% by weight of lime, 3⅓% by weight of commercial caustic alkali, and 80% by weight of water.

In testimony whereof I have signed my name to this specification.

CHESTER B. ALLEN.